United States Patent [19]

Manzo et al.

[11] 3,710,362

[45] Jan. 9, 1973

[54] HAND HELD TRANSDUCER INSENSITIVE TO ANGULAR ORIENTATION

[75] Inventors: Alan C. Kronfeld, Minneapolis; Paul S. Michael, Excelsior, both of Minn.

[73] Assignee: Nortronics Company, Inc., Minneapolis, Minn.

[22] Filed: Sept. 13, 1971

[21] Appl. No.: 179,675

[51] Int. Cl. ...................................... G11b 5/24

[52] U.S. Cl. .................................. 340/174.1 F, 179/100.2 C, 340/146.3A

[58] Field of Search ........................ 340 174.1 F; 346/74 MC; 179/100 AC; 340 146.3 C; MQ, SY

[56] References Cited

UNITED STATES PATENTS

| | | | |
|---|---|---|---|
| 3,674,943 | 7/1972 | Benson | 179 100.2 C |
| 3,376,035 | 4/1966 | Bate et al | 340 174.1 F |
| 2,917,588 | 12/1959 | White | 179 100.2 C |
| 3,178,519 | 4/1965 | Blumenthal | 340 174.1 F |
| 3,057,967 | 10/1962 | Clark | 179 100.2 C |
| 2,939,920 | 6/1960 | Leilich | 179 100.2 C |
| 2,801,293 | 7/1957 | Howell et al | 179 100.2 C |
| 2,920,379 | 1/1960 | Hagopian | 179 100.2 C |

*Primary Examiner*—Vincent P. Canney

[57] ABSTRACT

A pen-like device for reading magnetically coded data is shown, having a magnetic transducer mounted at one end thereof. The magnetic transducer has an outer, tubular core piece having a conical tip with an axial opening at the apex thereof. An inner, rod-like core piece is mounted within the outer core piece along a longitudinal axis thereof, with an end of the inner core piece extending into the axial opening to form a circular gap therebetween.

4 Claims, 7 Drawing Figures

INVENTORS.
ALAN C. KRONFELD
PAUL S. MICHAEL
BY
MERCHANT & GOULD
ATTORNEYS

HAND HELD TRANSDUCER INSENSITIVE TO ANGULAR ORIENTATION

BACKGROUND OF THE INVENTION

1. Field of the Invention

This invention relates generally to magnetic transducer constructions, and more particularly relates to the construction of a pen-like device having a magnetic transducer mounted on one end thereof, the transducer having a circular gap between the inner and outer core pieces forming the magnetic circuit of the transducer.

2. Description of the Prior Art

In recent years, manually movable devices have been developed for reading magnetically coded data carried by credit cards, sales tickets, labels and the like. These devices include a small reading device capable of being held in the hand of the operator, a console or terminal unit capable of recording or otherwise processing the information read, and a circuit carrying cable connecting the units. This type of device can be used by sales clerks in department stores, for example, to record sales and inventory. Each item of goods carries a label having digital magnetic data recorded thereon. The reading device carries a small magnetic head positioned so that the operator can pass it directly over the data recorded on the label. The electrical signals produced by the magnetic head are transmitted to the terminal where they are recorded or otherwise utilized.

In the prior art systems, the reading device utilizes a magnetic head having a gap between the pole pieces thereof that extends along a line, and lies within a plane. In order to produce readable signals, a magnetic head having a linear gap must be passed over the recorded information on the label so that the relative movement of the recorded data is perpendicular to the linear gap. With standard linear gaps, the output signal from the head is reduced drastically if the gap is not aligned properly with the magnetic data being read. Therefore, with prior art systems, it is necessary that the operator pass the reading device over the label in a predetermined orientation, otherwise the reading device may not produce a readable signal. If the operator is not properly trained or is careless, the system may not record every transaction.

SUMMARY OF THE INVENTION

The present invention provides a pen-like device having a magnetic transducer mounted at one end thereof. The magnetic transducer has a conical tip with a gap formed at the apex thereof along the arc of a circle. A circular gap is omnidirectional in the sense that it will produce the same signal from a given bit of magnetic coding regardless of the orientation about its own axis in which it is positioned with respect to the coded information. Therefore, a pen-like device with a circular gap cannot be misaligned with respect to the information being read. The operator need not be concerned with the axial orientation of the pen with respect to the data, thereby eliminating the misalignment errors inherent in prior art systems. Other embodiments of the invention are more fully described in the following specification.

DESCRIPTION OF THE PREFERRED EMBODIMENTS

Figures 1, 2, 3, 4, 5, 6, 7:
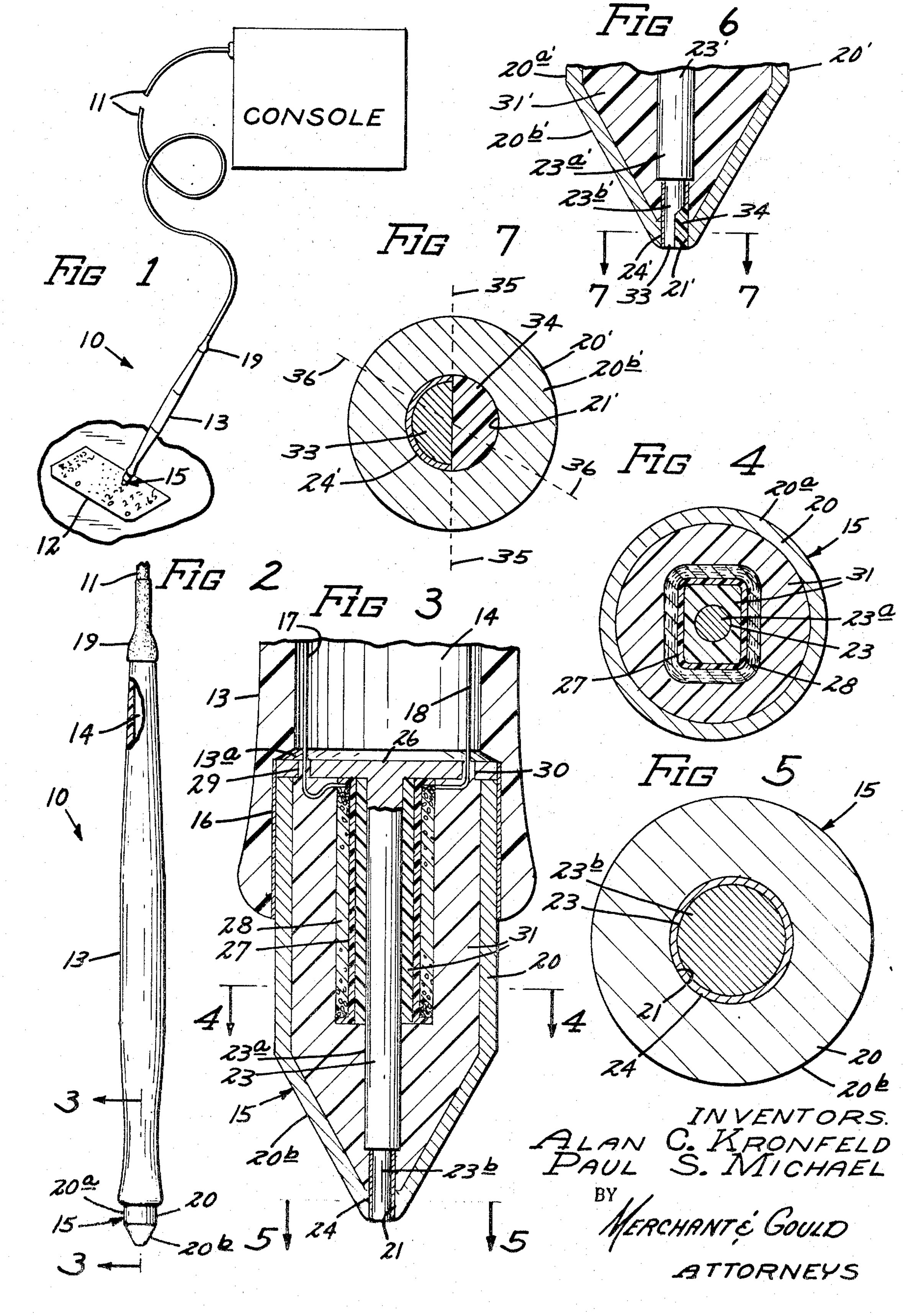
FIG. 1 is a schematic representation of a system employing a pen-like device of the present invention.
FIG. 2 is a view in side elevation of the pen-like device, portions thereof being broken away and portions being shown in section.
FIG. 3 is an enlarged, fragmentary sectional view taken along line 3—3 of FIG. 2.
FIG. 4 is a sectional view taken along line 4—4 of FIG. 3.
FIG. 5 is a sectional view taken along line 5—5 of FIG. 3.
FIG. 6 is a sectional view similar to FIG. 3, showing an alternate embodiment of the invention.
FIG. 7 is a sectional view taken along line 7—7 of FIG. 6.

Referring now to the drawings, there is disclosed in FIG. 1 a typical system including a pen-like device 10 having an electrical circuit carrying cable 11 extending from the upper end thereof for connection to a central console or terminal device. The pen-like device 10 is designed to read magnetically coded information carried by a card or label 12. The magnetic data, usually digital in form, can be recorded or deposited on the card 12 in any well-known fashion.

Referring now to FIG. 2, the pen-like device 10 includes a tubular casing 13 having an outer configuration like that of a typical pen, and having a hollow center 14. The hollow center 14 terminates in openings at the top and bottom ends of the casing 13. A magnetic transducer 15 is mounted in the opening at the bottom end of casing 13. As shown in more detail in FIG. 3, the opening is counterbored to provide a shoulder 13*a* against which the upper end of magnetic transducer 15 is positioned. As best shown in FIG. 3, the upper end of transducer 15 is secured to the walls of the counterbored opening by an adhesive 16. A pair of wires 17 and 18 extend from transducer 15 upwardly through hollow center 14 and through an opening formed in a plug or cap-like device 19 secured in the opening at the upper end of casing 13. Wires 17 and 18 extend through cable 11 to the console.

Magnetic transducer 15 includes an outer, generally tubular core piece 20 having an upper portion 20*a* in the form of a cylinder and a lower portion 20*b* formed in the shape of a cone. The conical portion 20*b* has an axial opening 21 at the apex thereof. The outer core piece 20 has a relatively thin wall compared to the overall diameter of the transducer, with the axial opening 21 being formed in the wall at the very tip or point of the pen-like device 10. In the preferred embodiment, axial opening 21 is circular. Also in the preferred embodiment, the outer core piece 20 tapers inwardly toward axial opening 21 around the entire periphery thereof to define a conical end portion. However, other tapered configurations might also be used.

An inner core piece 23 is also provided. Inner core piece 23 is a rod-like member having a main portion 23*a* of a first diameter which is considerably smaller than the diameter of the cylindrical upper portion 20*a*. It also has a smaller diameter portion 23*b*, having a circular cross section, which extends into axial opening 21 to form a circular gap therebetween. A gap spacer 24 is positioned around portion 23*b* of inner core piece 23 to fill the gap between the core pieces. Gap spacer 24 may be a shim of metallic material such as beryllium-copper or aluminum, a plastic material such as mylar plastic, or a deposited material such as silicon monoxide. The tip of the pen-like device 10, including the apex of conical lower portion 20*b* and portion 23*b* of inner core piece 23 are rounded off in a continuous curve to form a ball-like end as shown in FIG. 3.

In the preferred embodiment, inner core piece 23 is formed from a piece of suitable metal and includes a circular cover member 26 formed as a part of the upper end thereof. Cover member 26 has a diameter corresponding to the diameter of outer core piece 20 so that it covers the open upper end thereof. Inner core piece 23 extends downwardly from the center of cover member 26 so that cover member 26 acts to hold inner core piece 23 along the longitudinal axis of magnetic transducer 15. A plastic bobbin 27 is mounted on main portion 23*a* of inner core piece 23. Bobbin 27 carries a multiple-turn winding or coil 28 thereon. The wires 17 and 18 extend downwardly through a pair of openings 29 and 30 in cover member 26 for connection with the ends of coil 28. The interior opening of magnetic transducer 15 may be filled with an epoxy insulating material 31 to securely retain all of the elements in the desired positions. The epoxy material 31 may extend upwardly into the openings 29 and 30 to insulate the wires 17 and 18 from the cover member 26, or other insulating material may be provided to isolate the wires, if desired.

The pole pieces or core pieces 20 and 23, including the cover member 26, are formed of a permeable, low-retentivity magnetic material of the type generally used for magnetic recording heads. A complete magnetic circuit is formed by the outer core piece 20, the cover member 26 and the inner core piece 23. As previously mentioned, the advantage of a circular gap is that the same signal will be produced regardless of the orientation of the pen-like device about its own axis. Assuming that the operator runs the pen-like device 10 over the magnetic data so that the information read is comprehensible to the computer console, the operator need not be concerned with the orientation of the pen about its own axis. The coded information will pass by the gap in a generally radial direction regardless of the pen orientation. This removes one source of potential error inherent in prior art systems.

A prior art reading device with a magnetic head having a linear gap will produce a single electrical impulse as the head passes over a bit of magnetic data on the label. In the present invention, with the circular gap, two electrical impulses will normally be produced by the head as it passes over a single bit of data, because an impulse will be produced by both the leading and trailing portions of the circular gap. The computer console is then programmed to recognize that each bit of data will produce a double signal. If it should be desired to retain substantially all the advantages of a circular gap but yet produce only a single impulse for each bit of data, the embodiment of FIGS. 6 and 7 can be used. In the embodiment of FIGS. 6 and 7, the same numeral designations will be used as for the first embodiment, together with a prime notation. In the embodiment of FIG. 6, the inner core piece smaller diameter portion 23*b'* has a basic configuration in the form of a cylinder. This configuration has been modified by removing a semi-cylindrical side wall portion thereof adjacent the bottom end of the core piece 23'. The remaining semi-cylindrical portion, identified by the numeral 33, forms a gap with the adjacent edge of the axial opening 21' in the form of an arc of a circle, and in particular a semicircle. The opening left by removing the side wall portion may be filled with a nonmagnetic material 34. The smooth outer configuration of the tip of the magnetic transducer is thus retained while providing a gap in the configuration of a semicircle. In this configuration, a double impulse will be produced only if the bit of magnetic material passes the tip along the dashed line indicated by the numeral 35 in FIG. 7. A bit of magnetic material passing by the tip along any other line will intersect the semicircular gap 24' at only one point and this will produce only one impulse. The form of the pen-like device 10 might then be changed to provide a readily recognizable indication that the magnetic data should not follow the path 35. As an example, if the bit of magnetic data passes in either direction past the tip along the dashed line 36, only a single impulse will be produced.

The basic advantage of having a gap that follows the arc of a circle is that the operator need not be concerned with aligning the gap directly perpendicular to the path of travel over the material to be read. In a gap following the arc of a circle, the bit of information will always pass by the gap in a generally radial direction. Therefore, in the embodiment of FIGS. 6 and 7, where the arc length is 180°, the advantages of the circular-type arc are retained while having only one narrow arc along line 35 on which a double signal might be produced. As the gap arc length is reduced below 180°, the chances of a double signal arising is also reduced. As the gap arc length increases beyond 180°, the omnidirectional effect of the gap also increases but the chances of receiving a double impulse also increase. One skilled in the art can thus select a suitable gap arc length based upon an evaluation of the signal desired, the type of terminal equipment being used, etc. These novel features of the present invention are set forth in the appended claims.

What is claimed is:

1. A pen-like read-out device for magnetically recorded digital data, including an elongated hollow casing having a pen-like outer configuration with open top and bottom ends, and a magnetic transducer fixedly mounted in said open bottom end, said transducer comprising:

a. an outer core piece having an upper end, a lower end, and an axial bore extending therebetween;

b. said outer core piece having at least a portion thereof adjacent said lower end tapered toward an apex located at said lower end, said apex having a generally circular axial opening leading to said bore;

c. a rod-like inner core piece having first and second ends, with a coil mounted thereon between said ends;

d. means mounting said inner core piece and said coil coaxially in the bore of said outer core piece and spaced therefrom, with said first end of said inner core piece extending into said axial opening to form a generally circular gap therebetween, the end of said gap lying in a plane perpendicular to the axis of said bore;

e. gap spacer means in said gap;

f. magnetically conductive means connecting said second end of said inner core piece to said upper end of said outer core piece; and g. electrical circuit means extending from said coil through said elongated hollow casing and out said open top and adapted to be connected to an operating console.

2. A magnetic transducer comprising:

a. an outer, generally tubular core piece having first and second ends;

b. said outer core piece having at least an end portion thereof tapering toward said first end around the entire periphery thereof and defining a generally circular axial opening at said first end;

c. an inner core piece having a longitudinal axis, a coil mounted thereon between first and second ends thereof, said first end being of generally circular cross-sectional configuration with a predetermined side wall portion thereof being cut away to leave a remaining portion;

d. means mounting said inner core piece and coil in said outer core piece with said remaining portion of said first end of said inner core piece extending into said axial opening to form a gap between said remaining portion and a corresponding edge of said axial opening generally in the form of an arc or a circle, the ends of said inner and outer core pieces forming said arcuate gap lying in a plane extending perpendicular to said longitudinal axis;

e. gap spacer means in said gap; and f. means connecting the second ends of said inner and outer core pieces to complete a magnetic circuit therewith.

3. The transducer of claim 2 wherein said remaining side wall portion of said first end of said inner core piece is generally a semicircle in cross section, thereby forming a semicircular gap.

4. A magnetic transducer comprising:

a. an outer generally tubular core piece having an open upper end, a smaller diameter lower end, and a bore extending therebetween;

b. said outer core piece having at least a portion thereof adjacent said lower end formed generally in the shape of a cone and having an axial opening at an apex of said conical portion located at said lower end, said axial opening leading to said bore;

c. a rod-like inner core piece having a coil mounted thereon, said inner core piece having a first end portion with a circular cross section, and a second end located opposite said coil therefrom terminating adjacent said upper end of said outer core piece;

d. means mounting said inner core piece and coil in the bore of said outer core piece along a longitudinal axis thereof, with said first end portion of said inner core piece extending into said axial opening to form a circular gap therebetween, the ends of said core pieces forming said gap both lying in a plane perpendicular to said longitudinal axis;

e. gap spacer means in said circular gap;

f. magnetically conductive cover means mounted on said open upper end of said outer core piece, said cover means being connected to said inner core piece at its center; and g. openings in said cover means to provide a path for circuit means connected to said coil.

* * * * *